(12) United States Patent
O'Brien

(10) Patent No.: US 7,136,639 B2
(45) Date of Patent: Nov. 14, 2006

(54) SUB BASE STATION AND USER EQUIPMENT IMPLEMENTATIONS

(75) Inventor: J. Thomas O'Brien, Limerick, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 556 days.

(21) Appl. No.: 09/981,386

(22) Filed: Oct. 16, 2001

(65) Prior Publication Data

US 2002/0193069 A1    Dec. 19, 2002

Related U.S. Application Data

(60) Provisional application No. 60/298,167, filed on Jun. 14, 2001.

(51) Int. Cl.
  *H04Q 7/20*    (2006.01)
(52) U.S. Cl. .................. 455/426.1; 455/7; 455/444
(58) Field of Classification Search ............... 455/436, 455/437, 439, 444, 61, 11.1, 417
  See application file for complete search history.

(56) References Cited

U.S. PATENT DOCUMENTS

| | | | | |
|---|---|---|---|---|
| 5,930,728 A | * | 7/1999 | Evanyk | 455/426.1 |
| 6,011,978 A | * | 1/2000 | Ault et al. | 455/552.1 |
| 6,167,278 A | * | 12/2000 | Nilssen | 455/462 |
| 6,230,008 B1 | * | 5/2001 | Garcia Pedraja et al. | 455/426.1 |
| 6,253,088 B1 | * | 6/2001 | Wenk et al. | 455/462 |
| 6,327,470 B1 | * | 12/2001 | Ostling | 455/437 |
| 6,445,921 B1 | * | 9/2002 | Bell | 455/426.1 |

* cited by examiner

Primary Examiner—Daniel Swerdlow
(74) Attorney, Agent, or Firm—Volpe and Koenig, P.C.

(57) ABSTRACT

A wireless communication station comprises a base station, a sub base station and a plurality of user equipments. The base station transmits a downlink communication and receives a combined uplink communication from the sub base station. The sub base station receives the downlink communication from the base station. The sub base station transmits the downlink communication to a plurality of user equipments. The sub base station receives uplink communications from the plurality of user equipments. The sub base station combines the received uplink communications as the combined uplink communication and transmits it to the base station. The plurality of user equipments receive downlink communications from the sub base station and transmits uplink communications to the sub base station.

5 Claims, 6 Drawing Sheets

SUB BASE STATION AND USER EQUIPMENT IMPLEMENTATIONS

This application claims priority to Provisional Patent Application No. 60/298,167 filed on Jun. 14, 2001.

BACKGROUND

The invention generally relates to wireless communication systems. In particular, the invention relates to implementations of sub base stations and user equipments in wireless communication systems.

FIG. 1 is a simplified illustration of a wireless communication system. A user equipment (UE) 22, such as a cellular phone, and a base station 20 send communications to each other. Communications from the base station 20 to the UE 22 are referred to as downlink communications. Communications from the UE 22 to the base station 20 are referred to as uplink communications. The physical structure of the communications is based on the type of wireless system deployment, such as analog frequency division duplex (FDD), FDD using code division multiple access (CDMA), time division multiple access (TDMA), TDMA using CDMA or time division duplex (TDD) using CDMA.

The UE 22 communications are sent to another user via a public switched telephone network (PSTN) 30. The communications are transferred from the base station 20 to the PSTN 30, typically, via a Node-B 24, a radio network controller (RNC) 26 and a core network 28.

It is desirable to have alternate implementations of user equipments in wireless systems.

SUMMARY

A wireless communication station comprises a base station, a sub base station and a plurality of user equipments. The base station transmits a downlink communication and receives a combined uplink communication from the sub base station. The sub base station receives the downlink communication from the base station. The sub base station transmits the downlink communication to a plurality of user equipments. The sub base station receives uplink communications from the plurality of user equipments. The sub base station combines the received uplink communications as the combined uplink communication and transmits it to the base station. The plurality of user equipments receive downlink communications from the sub base station and transmits uplink communications to the sub base station.

BRIEF DESCRIPTION OF THE DRAWING(S)

DETAILED DESCRIPTION OF THE PREFERRED EMBODIMENT(S)

Figure 1:
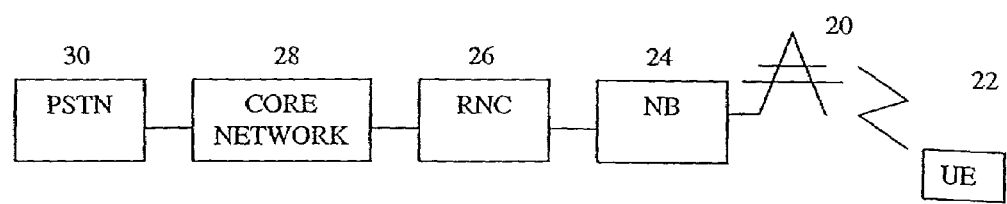
FIG. 1 is an illustration of a simplified wireless communication system
Figure 2:
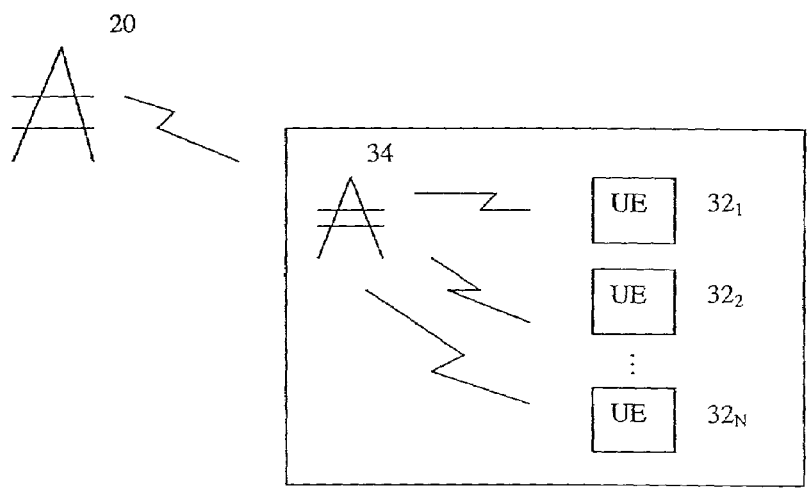
FIG. 2 is an illustration of a sub base station implementation.

FIG. 2 is an illustration of a sub base station (sub base) implementation. Instead of the base station 20 communicating directly with the UEs $32_1$–$32_N$ (32), a sub base interfaces between the base station 20 and UEs 32. The sub base 34 communicates wirelessly with UEs 22 in its operating range. Typically, the sub base 34 has a much shorter operating range than the base station 20, such as 150 feet (30 meters).

A typical application for the sub base implementation is in a residential or office environment, although other applications may be used. In a residential environment, each family member or certain rooms have a UE 32. In an office environment, each employee or each office has a UE 32.

Figure 3:
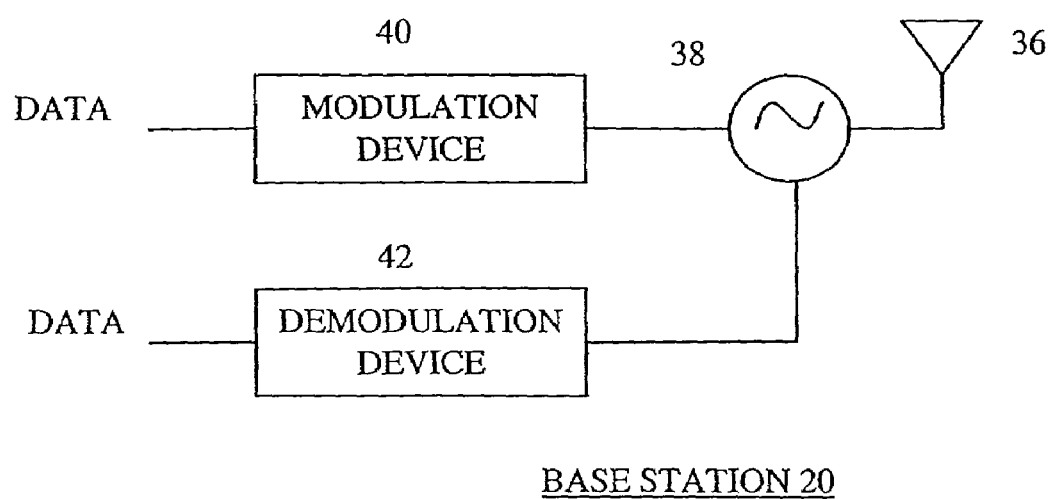
FIG. 3 is an illustration of a simplified base station.
Figure 4:
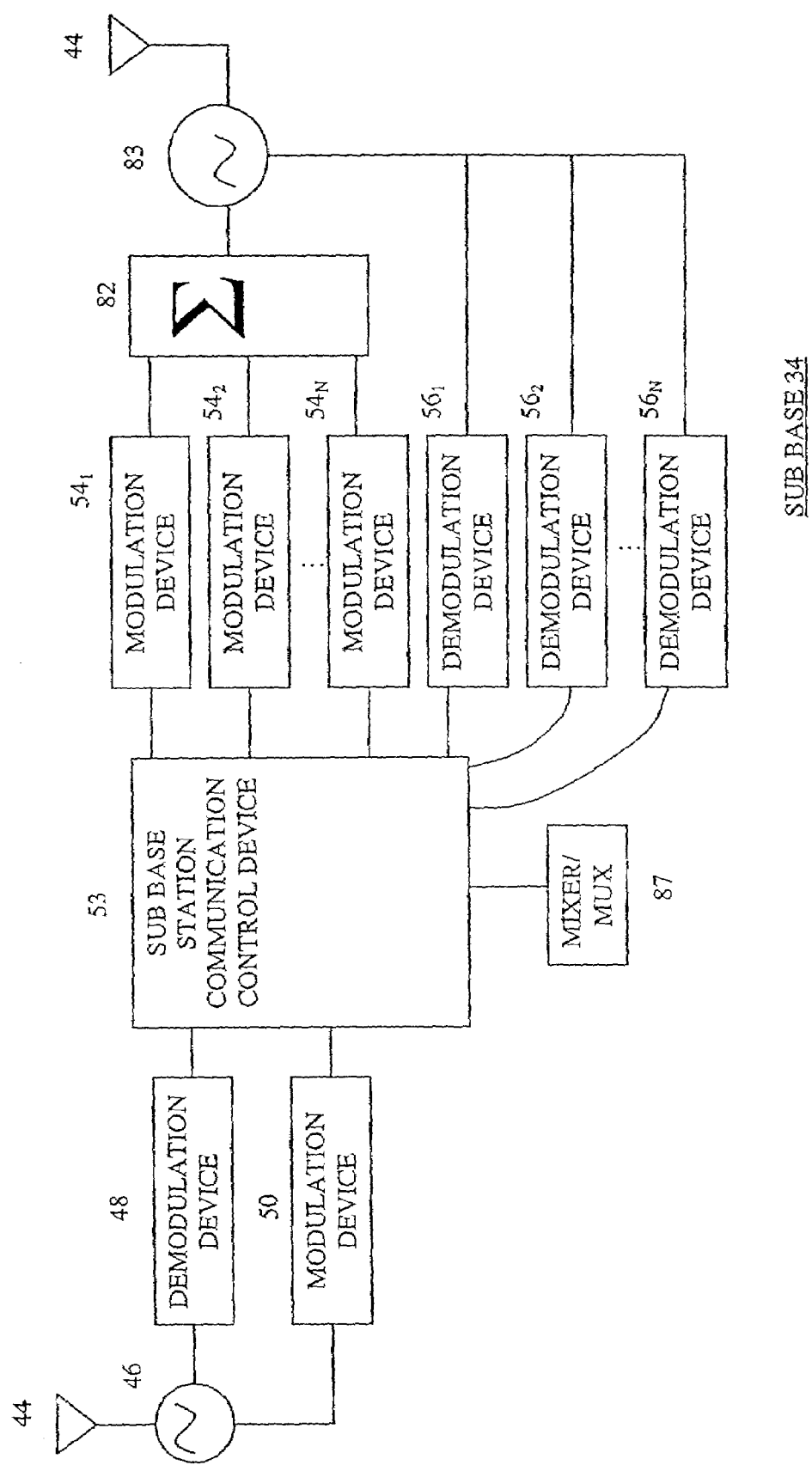
FIG. 4 is an illustration of a sub base station.
Figure 5:
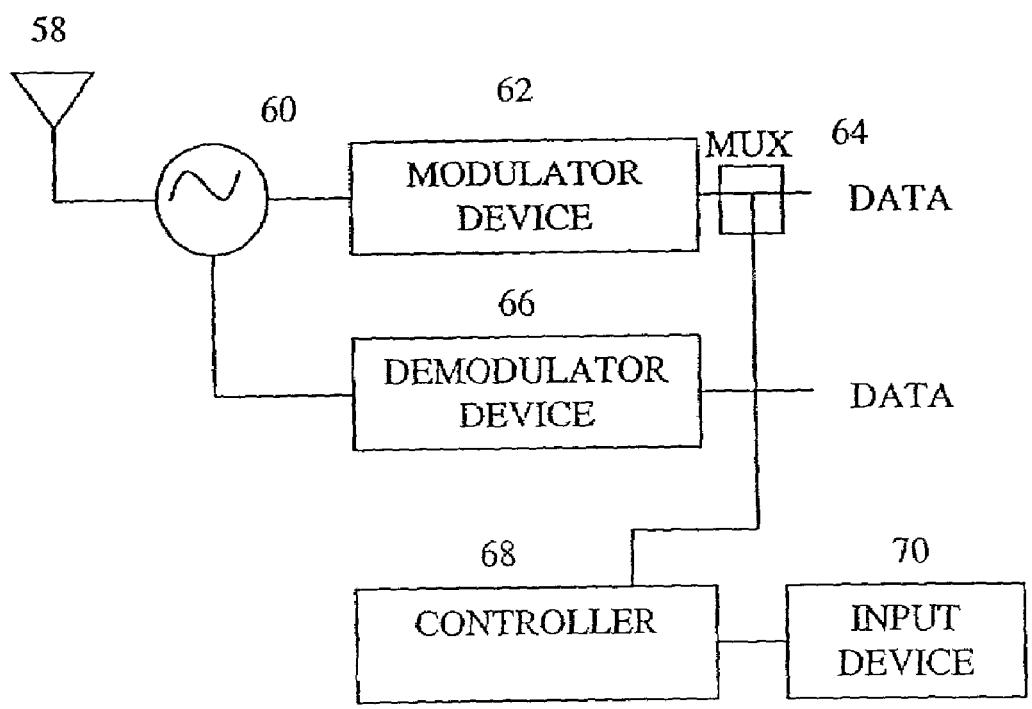
FIG. 5 is an illustration of a simplified user equipment.

Operation of the sub base 34 implementation is described in conjunction with FIGS. 3, 4 and 5. FIG. 3 is an illustration of a simplified base station; FIG. 4 is an illustration of a simplified sub base; and FIG. 5 is an illustration of a simplified UE.

Data to be communicated to UE(s) 32 from a user of the PSTN 30 is modulated at the base station 20 using a modulation device 40. The modulation scheme is based on the wireless system deployment, such as an analog FDD TDMA, FDD CDMA, TDMA/CDMA and TDD/CDMA system deployment. The modulated data is passed through an isolator or switch 38 and is radiated by an antenna 36 through a wireless radio channel, as a downlink signal.

The downlink signal is received by an antenna 44 of the sub base 34. The downlink signal passes through an isolator or switch 46 and is demodulated by a demodulation device 48, to recover the original data. The recovered data is routed to a modulation device(s) $54_1$–$54_N$ (54). Each modulation device 54 is uniquely associated with a specified UE 32. The sub base 34 may use one of many typical modulation schemes of a wireless communication system, such as analog FDD, TDMA, FDD CDMA, TDMA/CDMA and TDD/CDMA, or a cordless phone scheme, such as analog FDD or CDMA at frequencies of 900 megahertz (MHz) or 2.4 gigahertz (GHz). The modulated data signals are combined by a combiner 82. The combined signal is passed through an isolator or switch 83 and is radiated by an antenna 44. This antenna 44 may be the same as the antenna 44 receiving the base station signal or is distinct.

At each UE 32, the combined signal is received by an antenna 58. The received signal is passed through an isolator or switch 60 to a demodulation device 66. The demodulation device 66 recovers the original data for that UE 32, such as using a frequency, time slot and/or channelization code associated with that UE 32. If the UE 32 is a cellular/cordless phone, the original data is typically of a voice signal. Preferably, the cellular/cordless phone is in the physical shape of a traditional cordless phone for user comfort, although other physical shapes may be used, such as a cell phone. If the UE 32 is a computer or personal digital assistant (PDA), the original data is typically digital data, which is recovered by a modem.

For data sent from each UE 32, the UE data is modulated by a modulation device 62. The modulated data is passed through an isolator or switch 60 and is radiated by an antenna 58.

The sub base antenna 44 receives the UE transmitted signals from all the UEs 32. Each UE's data is distinguishable, such as by frequency, time slot and/or channelization code. A demodulation device $56_1$–$56_N$ (56) is uniquely associated with each UE 32. Each UE's transmitted data is recovered by its associated demodulation device 56. The sub base communication control device (SB controller) 53 determines whether multiple UE transmissions were received. If only one UE transmission was received, that UE's data is sent to the modulation device 50. If multiple UE transmissions were received, each signal is sent to a mixer/multiplexer 87. For transmitted analog or digital voice signals, a voice signal mixer 87 mixes the multiple voice signals together. For computer/PDA data, the signals are multiplexed together. The mixed/multiplexed signals are sent to the modulation device 50.

The modulation device 50 modulates the data based on the wireless system deployment. The modulated signal is passed through the isolator or switch 46 and radiated by an antenna 44 through a wireless radio channel. The base station antenna 36 receives the transmitted signal. The received signal is passed through the isolator or switch 38 and demodulated using a demodulation device 42 to recover the UE(s) data. The recovered data is sent through the PSTN 30 to the intended user.

In one sub base/UE implementation, the sub base 34 is associated with a single telephone number. When a call is made to that number, the base station 20 transmits the associated data to the sub base 53. The sub base 53, in turn, transmits that information to all the UEs 32. For instance, all the UEs 32 will ring, when a call to that number is made. Any UE 32 can pick up on the call. Once one UE 32 picks up, other UEs 32 can join into the call.

For voice calls, the sub base 53 mixes other UE's voice signals with the user's transmitted voice signal prior to transmission to each UE 32. The SB controller 53 sends the received voice signals to the mixer 87 for voice mixing. Each UE 32 is transmitted and receives the mixed voice signals of the other user and the other UEs 32. For computer/PDA data, analogous multiplexing is typically not performed unless instant messaging is performed.

When a UE 32 initiates a call, other UEs 32 can join in similarly. To prevent other users from joining into an existing call, the original UE 32, such as the call initiating or only one currently communicating, can use a privacy mode. The user of that UE 32 inputs an appropriate signal into an input device 70 of the UE 32, such as "*P"("*7") into a traditional phone keypad. A controller 68 produces a signal representing privacy mode. The privacy signal is either multiplexed by a multiplexer 64 with UE data or transmitted as a separate signal to the sub base 34. The SB controller 53 disables the modulation and demodulation devices 54, 56 of the other UEs 32, after the sub base 34 receives the privacy signal. As a result, none of the other UEs 32 can join the call.

In another implementation, the sub base 34 is associated with multiple telephone numbers. The sub base 34 will have a demodulation and modulation device 48, 50 associated with each telephone number to recover data associated with that number. Each UE 32 or a group of the UEs 32 may be associated with one telephone number. The SB controller 53 routes communications for the telephone number between that telephone number's modulation/demodulation devices 48, 50 and that number's UEs 32. For a group of UEs 32 associated with a number, other UEs 32 in the group can join in or privacy mode can be initiated by a UE 32 of the group.

Alternately, no UEs 32 are associated with a number. When a UE 32 initiates a call, an available telephone number is selected by the SB controller 53. Other UEs 32 can join in or privacy mode initiated. When a call to any of the telephone numbers is made, all of the UEs 32 ring. Any UE 32 can pick up on the call. Other UEs 32 can join in or privacy mode is initiated. However, if privacy mode is initiated, the SB controller 53 does not disable the other UE modulation/demodulation devices 54,56. The other UEs 32 can make calls on non-used telephone numbers. The sub controller 53 selects an unused number for such a call. Similarly, other UEs 32 can receive calls on unused telephone numbers. The SB controller 53 routes the other number's data to the unengaged UEs 32.

Figure 6:
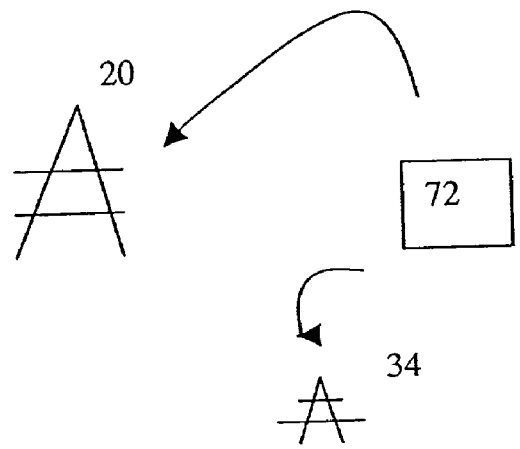
FIG. 6 is an illustration of a system implementing a dual use user equipment.
Figure 7:
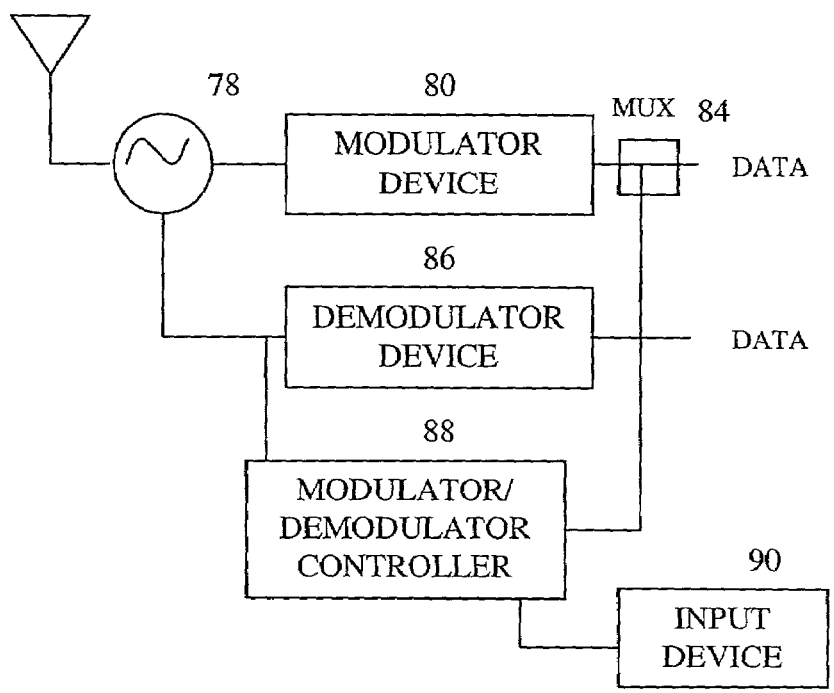
FIG. 7 is an illustration of a dual use user equipment.

FIG. 6 illustrates a system implementing a dual use UE 72. The dual use UE 72 is capable of directly communicating with the base station 20 and sub base 34. FIG. 7 is a simplified illustration of such a UE 72.

The dual use UE 72 periodically transmits a signal so that the sub base 34 can determine if the dual use UE 72 is in the area, "camping" on the sub base 72. If the SB controller 53 does not detect the signal, it assumes the UE 72 is out of range and operating as a UE 22 in the cellular system. The sub base 34 will cease to "camp" on the cellular base station 20 or cease its connection with the cellular base station 20 to allow calls to its number to be directed to the dual use UE 72.

When the dual use UE 72 is in the operating range of the sub base 34, it communicates with the sub base 34 which, in turn, communicates with the base station 20. The UE 72 determines whether it is in range of the sub base 34, such as by detecting a sub base pilot signal or periodic sub base signal. Alternately, a confirmation signal may be sent from the sub base 34 in response to the dual use UE's periodic signal. The dual use UE 72 may also cease transmitting the periodic signal in response to a user input to an input device 90, such as by pressing on a phone keypad "*C"("*2). By ceasing the periodic signal, the UE 72 effectively tells the sub base 34 to decamp, allowing the dual use UE 72 to act as a cellular UE 20. The modulation/demodulation controller 88 produces a decamp signal. The decamp signal is either transmitted to the sub base 34 or multiplexed by a multiplexer 84 into the dual use UE's data. Upon detection of the decamp signal, the sub base 34 no longer camps on the base station 20.

The dual use UE 72 may be able to hand off between the base station 20 and the sub base 34. When the dual use UE 72 detects it is leaving the range of the sub base 34, it will switch to the cellular base station 20. Alternately, the sub base 34 may detect the range limit and send a corresponding signal to the UE. The dual use UE 72 may compare the received signal strength, signal to noise ratio or bit error rate to a threshold to detect the range limit.

To initiate handoff, the dual use UE 72 sends a handoff signal to the sub base 34. The sub base 34 ceases communications with the cellular base station 20. The UE's modulation/demodulation controller 88 switches the modulation/demodulation scheme of the dual use UE 72 from the sub base scheme to the wireless scheme. Typically, the modulation scheme details are signaled from the sub base 34. When the sub base 34 ceases communications, the dual use UE 72 begins communicating to the base station 20.

Handoff may also be performed from the cellular base station 20 to the sub base 34. When the UE 72 detects the sub base 34, the UE 72 sends a handoff signal to the sub base 34. The UE 72 detects the sub base 34, such as by a pilot or periodic signal strength exceeding a threshold. The sub base 34 will begin communicating to the cellular base station 20 and the dual use UE 72 with the sub base 34. The dual use UE 72 will transmit the modulation/demodulation scheme details to the sub base 34.

Figure 8:
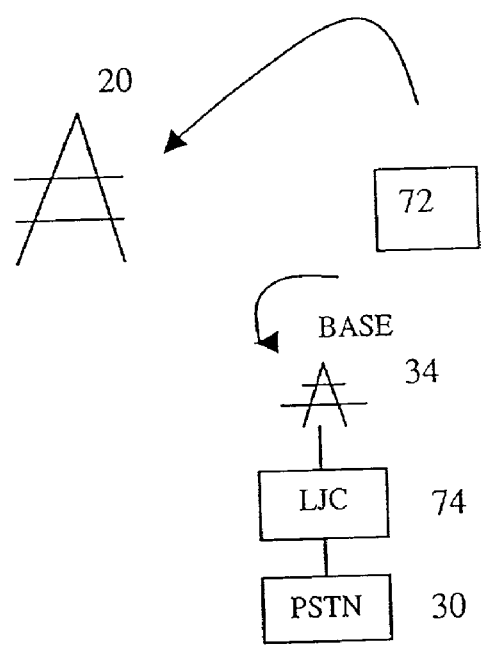
FIG. 8 is an illustration of a wireless and wired system using a dual use user equipment.

FIG. 8 illustrates a dual use UE 72 in a traditional cordless phone environment. The dual use UE 72 may communicate with either the base station 20 or wired system. The wired sub base 34 is wired to the local carrier 74. The local carrier 74 is connected to the PSTN 30. One drawback to this approach is that handoff is only possible with adaptations to the traditional wired and wireless systems.

What is claimed is:

1. A wireless dual use user equipment (UE) capable of operating in a cordless and cellular environment, the dual use user equipment comprising:
   a modulation and demodulation device for modulating/demodulating data using a plurality of modulation/demodulation schemes, the plurality of modulation/demodulation schemes comprise a cordless scheme for communicating with a sub base and a cellular scheme for communicating with a base station;
   a modulation and demodulation controller for switching the modulation/demodulation scheme of the modulation/demodulation device between the cordless scheme and the cellular scheme such that a transition between said cordless and cellular schemes is transparent to a user sending or receiving a communication signal from said dual use UE; the modulation and demodulation controller initiating operation in the cellular environment by sending a handoff signal to a sub base responsive to a determination that said UE is leaving a cordless environment and switching to the cellular scheme; whereby the sub base in response to the sent handoff signal ceases communications with a cellular base station and whereby in response to the ceased communications between the sub base and the cellular base station, the modulation and demodulation controller of the UE switches the modulation/demodulation scheme of the UE from the cordless scheme to the cellular scheme, thereby initiating communication of the UE directly with the cellular base station.

2. The dual use UE of claim 1 wherein the dual use UE determines it is leaving the cordless environment by measuring a received signal strength of a sub base transmission.

3. The dual use UE of claim 2 wherein the modulation and demodulation controller switches to the cellular environment when said signal strength is below a predetermined threshold.

4. The dual use UE of claim 1 wherein the dual use UE determines it is entering the cordless environment by detecting a sub base pilot signal.

5. The dual use UE of claim 4 wherein the dual use UE, upon detecting the sub base pilot signal, sends a handoff signal to the sub base; whereby the sub base commences communicating to the cellular network and the dual use UE begins communicating with the sub base.

* * * * *